June 26, 1956           C. LUZE           2,751,738
GANG DISC ANGLE CONTROL DEVICE
Filed July 10, 1952                       3 Sheets—Sheet 1
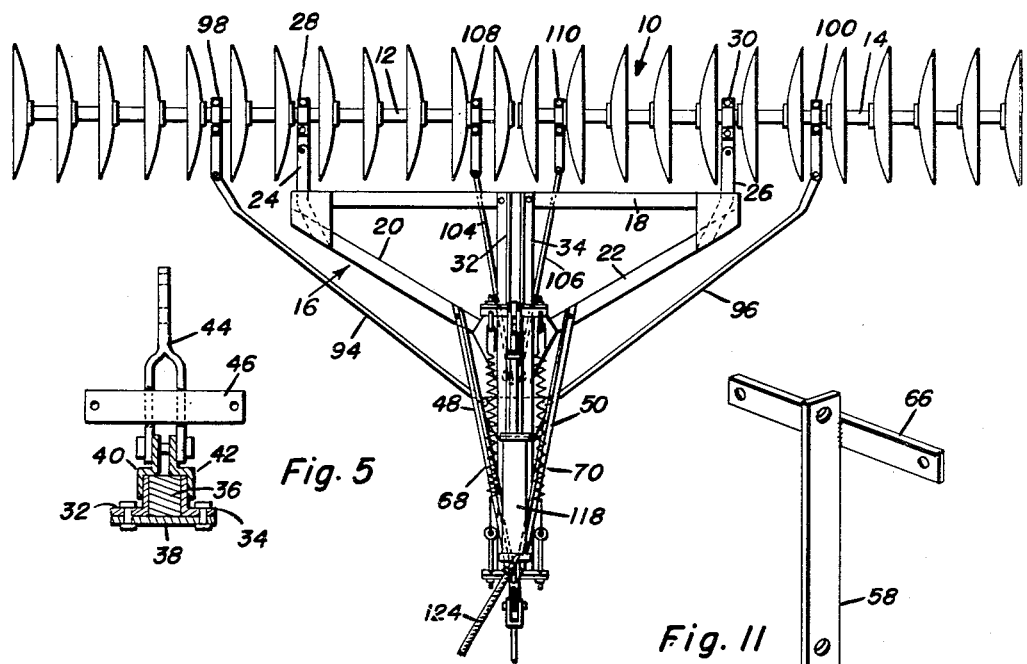
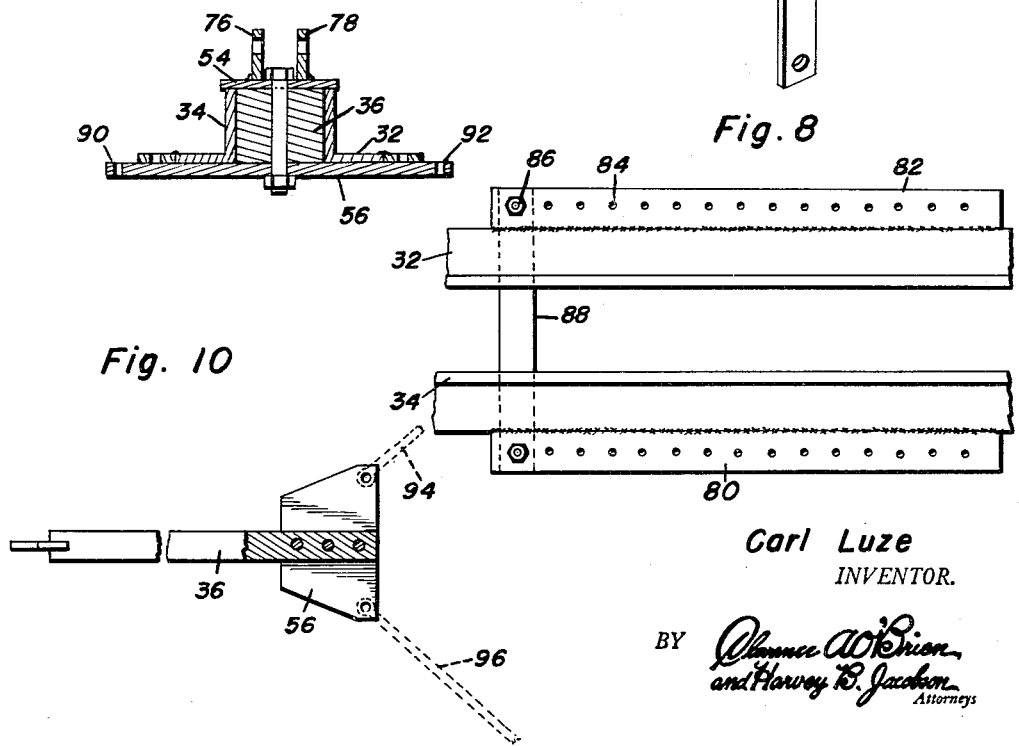
Carl Luze
INVENTOR.

Carl Luze
INVENTOR.

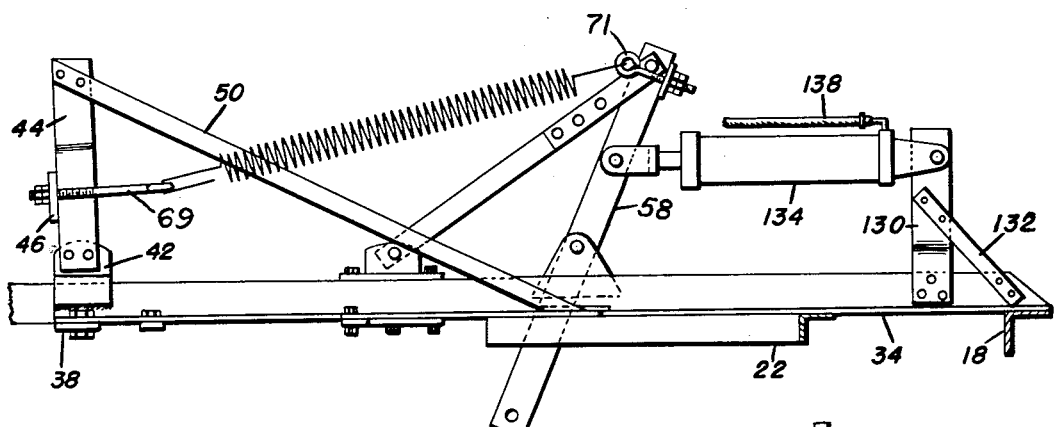
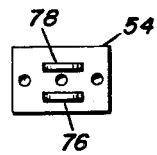
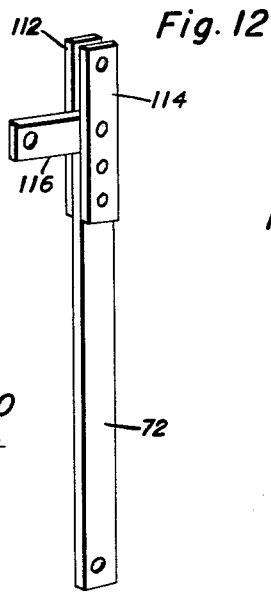
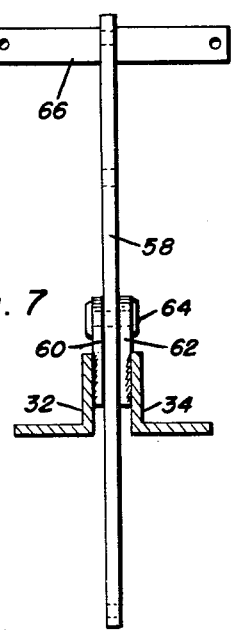
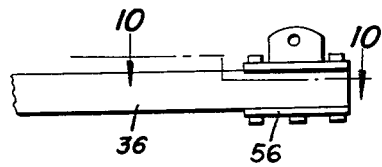
Carl Luze
INVENTOR.

United States Patent Office 2,751,738
Patented June 26, 1956

2,751,738

GANG DISC ANGLE CONTROL DEVICE

Carl Luze, Dysart, Iowa

Application July 10, 1952, Serial No. 298,057

3 Claims. (Cl. 55—81)

This invention relates to a disc angle control device and particularly to a power operated device for adjusting the angulation of a disc in a tractor drawn device.

In the operation of disc harrows it is customary to adjust an angulation of the harrow sections in order to control the angle of attack of the discs and the consequent cutting thereby. The present invention provides an angular control device having an operative lever pivotally mounted between the usual slide members of a disc hitch and controlling the adjusting rods of the disc sections so that a power cylinder may be attached to the lever to determine the angulation of the disc. A stop member is provided between the draw bar and the slide members so that the extent of the angulation may be determined.

It is accordingly an object of the invention to provide an improved angle control device.

It is a further object of the invention to provide a power operated angle control device for discs.

It is a further object of the invention to provide means for controlling the angulation of the sections of the disc.

It is a further object of the invention to provide a disc angle control having a spring biasing the angulation to a predetermined direction and a fluid actuated cylinder for moving the disc in a different direction.

Other objects and many of the attendant advantages of the present invention will be apparent from the following detailed description taken in conjunction with the accompanying drawings, in which:

Figure 1 is a top plan view of the disc with the angle control attached, with the cylinder expanded and the disc in de-angled position;

Figure 5 is a cross section through the de-angling device taken substantially on the plane indicated by the line 5—5 of Figure 2;

Figure 6 is a cross section taken substantially on the plane indicated by the line 6—6 of Figure 2 and showing the clevis plate and slide stop plate applied to the hitch bar and overlying and underlying the slide members;

Figure 7 is a cross section taken substantially on the plane indicated by the line 7—7 of Figure 2 and showing an elevation of the actuating lever;

Figure 8 is a plan view of the depth control;

Figure 9 is an elevation of the slide clevis on the end of the hitch bar;

Figure 10 is a sectional view taken substantially on line 10—10 of Figure 9;

Figure 11 is a perspective of an actuating arm;

Figure 12 is a perspective view of the linkage arm;

Figure 13 is a top plan view of the clevis plate; and

Figure 14 is a side elevation and modification according to the invention.

Figure 2:
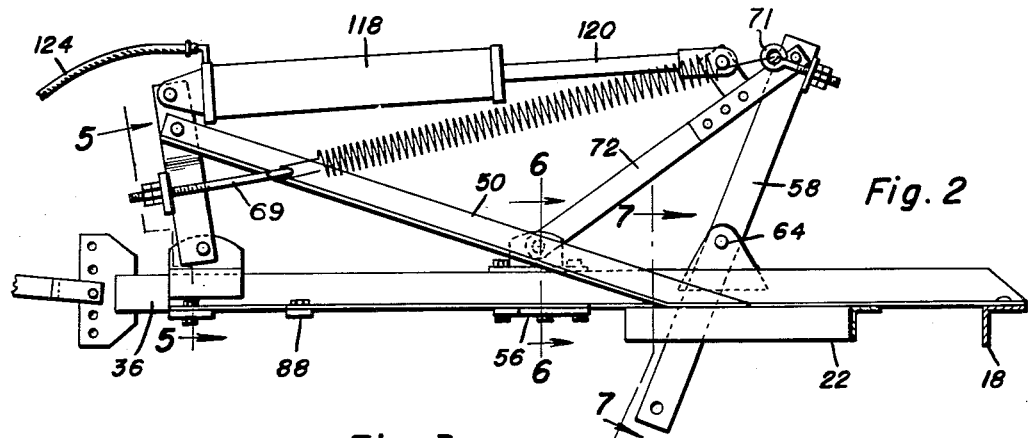
Figure 2 is an enlarged side elevation of the de-angling device in de-angled position.

In the illustrative embodiment of the invention a disc assembly 10 includes a pair of sections 12 and 14 mounted on a disc hitch 16 which comprises a spreader bar 18 and a pair of angular brace members 20 and 22. Hitch arms 24 and 26 are rigidly fixed adjacent the ends of the spreader member 18 and are provided with journals 28 and 30 for supplying the tractive effort to the disc sections 12 and 14. A pair of slide members 32 and 34 extend forwardly from the spreader bar 18 and extend forward for attachment in sliding relation to a hitch bar 36.

A spacer plate 38 is rigidly connected across the front end of the members 32 and 34 and provides a slide plate for the front end of the slide members 32 and 34. A pair of brackets 40 and 42 are rigidly mounted on the front end of the slide members 32 and 34 and preferably extend substantially inwardly thereover to provide a closure for the top of the slide members. An upstanding post 44 is rigidly mounted on the brackets 40 and 42 and has mounted transversely thereof a spring hanger bracket 46. A pair of brace members 48 and 50 extend between the top of the upstanding post 44 and the angularly extending members 20 and 22 respectively.

The hitch bar 36 is telescopingly received between the slide members 32 and 34 and the inner end of the hitch bar 36 has rigidly attached thereto clevis plate 54 which extends laterally over the edges of the slide members 32 and 34 so that the clevis plate 54 holds the hitch bar 36 in suspended relation between the slide members 32 and 34. The sliding stop plate 56 is also connected to the telescoping end of the hitch bar 36 and extends laterally beyond the edges of the slide members 32 and 34 for a purpose presently to be described.

The clevis plate 54 and the stop plate 56 rigidly support the hitch bar 36 in between the sliding members 32 and 34 so that they may slide but not be laterally displaced therefrom.

An actuating lever 58 is pivoted in ears 60 and 62 which are rigidly connected on the slide members 32 and 34 preferably by such integral connections as welding. The lever 58 is swivelled intermediate the ends thereof by means of a suitable pivot pin 64. A spring hanger bracket 66 is mounted on the lever 58 preferably adjacent to the top end thereof. The spring members 68 and 70 are mounted in tension between the spring hanger bracket 46 and the spring hanger bracket 66 by means of suitable adjustable connecting rods 69 and 71, respectively. A link 72 is pivotally connected to the arm 58 adjacent the upper end thereof by means of a pivot pin 74. The link 72 is pivotally mounted to the clevis plate 54 by means of ears 76 and 78.

Figure 3:
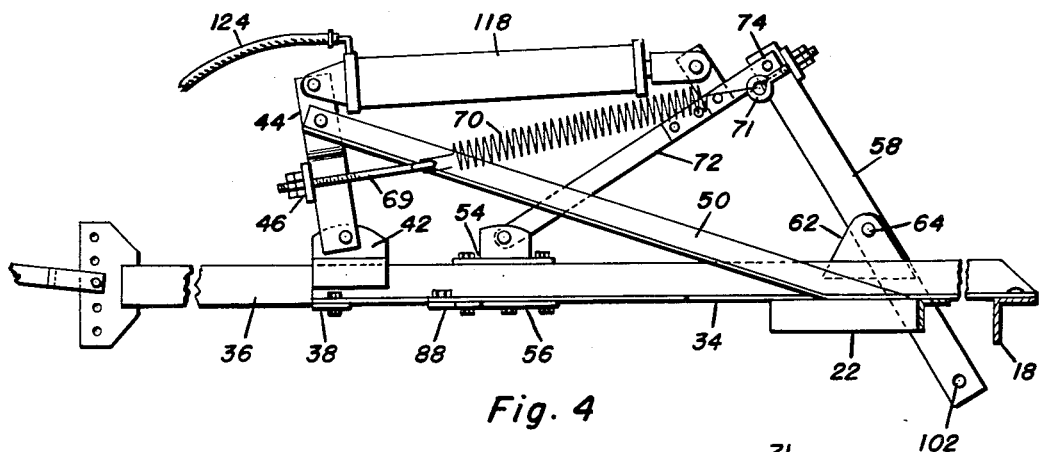
Figure 3 is a similar view in angled position.
Figure 4:
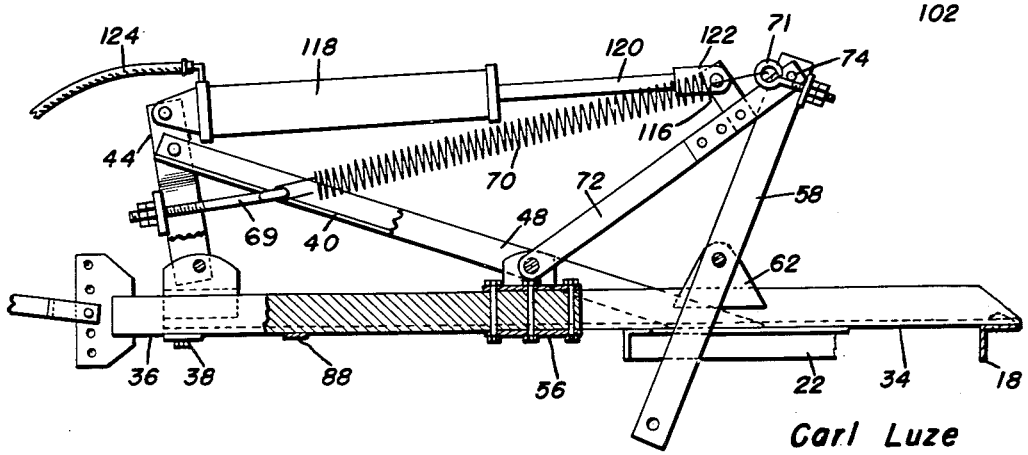
Figure 4 is an enlarged side elevation with parts broken away and in section to show the construction.

Stop gauge members or strips 80 and 82 are rigidly mounted to the sides of the slide members 32 and 34, respectively and are provided with apertures 84 for receiving bolts 86 for supporting a fixed stop plate 88 transversely of the slide members 32 and 34, see Figures 2, 3 and 8. The stop plate 88 is mounted in the path of travel of the sliding stop plate 56 so that the stop plate 56 contacts the stop plate 88 to control the maximum angulation of the sections 12 and 14 of the disc. Sliding stop plate 56 is provided adjacent the outer edge thereof with apertures 90 and 92 for receiving the outer angular control bars 94 and 96. The outer ends of the control bars 94 and 96 being journally connected to the sections 12 and 14 by suitable bearings 98 and 100.

The lower end of the actuating lever 58 is provided with an aperture 102 to which is connected the inner control rods 104 and 106. The control rods 104 and 106 are connected to the inner ends of the disc sections 12 and 14 by means of bearings 108 and 110.

The link member 72 is preferably provided with bifurcated ends 112 and 114 between which is mounted an extending lug 116. A fluid actuated cylinder 118 is pivotally mounted in any suitable manner on the top of the post 44 and has a piston rod 120 extending therefrom and pivotally connected to the upstanding lug 116 by means of a bifurcated end 122. A fluid supply line 124 is connected to supply fluid pressure into the cylinder 118.

As shown in Figure 14, in lieu of connecting the cylinder between the post 44 and lever 58 as previously described, an auxiliary post 130 may be mounted on the slide members 32 and 34, said auxiliary post could be supported, for example, by means of a brace 132 and a cylinder 134 can be pivotally connected between the post 130 and an intermediate portion of the actuating lever 58. A fluid pressure line 138 supplies energizing fluid into the cylinder 134.

A double acting piston may be used to positively control the position of the lever 58 instead of the biasing springs 68 and 70 and single acting piston 118 or 134.

In the operation of the device according to the invention, springs 68 and 70 operate to pivot the upper portion of lever 58 to a forward position so that the clevis plate 54 will be moved forward so that the draw hitch bar 36 will be extended relative to the slide bars 32 and 34 and the lower slide plate 56 will come into contact with the fixed stop plate 88 as clearly shown in Figure 3. In this position the outer control bars 94 and 96 will be drawn forward to move the outer ends of the disc sections forward and the inner control bars 104 and 106 will be moved rearwardly to move therewith the inner end of the sections 12 and 14 so that the disc will be at an angled relation relative to the line of travel of the hitch 36. The stop plate 88 can be adjusted in any of the apertures 84 of the plates 80 and 82 so that the extent of the angulation may be determined by contact of the sliding stop plate 56 with the fixed stop plate 88.

To de-angle the device, fluid is applied into the cylinder 118 which will extend the piston rod 120 to cause pivotal motion of the lever 58 about the pivot pin 64 so that the slide stop plate 56 will be withdrawn and the slide members 32 and 34 will be telescoped over the hitch bar 36. This will cause rearward motion of the outer control rods 94 and 96 and forward motion of the inner control bars 104 and 106 so that the angle sections 12 and 14 will be moved into transverse alignment with each other so that the disc is de-angled.

For purpose of illustration a particular embodiment of the invention has been shown and described according to the best present understanding thereof. It will be apparent to those skilled in the art that changes and modifications can be made therein without departing from the true spirit of the invention.

Having described the invention, what is claimed as new is:

1. A power actuated angle control device for disc harrow gangs comprising a hitch bar, a disc hitch frame including a pair of spaced apart side frame members telescopingly engaging said hitch bar, an actuating lever pivoted on said side frame members, said lever extending above and below said side frame members, an upper clevis plate secured on said hitch bar, said clevis plate extending laterally over said side frame members, a rigid link extending between said clevis plate and a point adjacent the top of said lever, an anchor post mounted on said frame, a fluid actuated cylinder connected in operative relation between said post and said lever, a gauge strip mounted on said side frame members, a stationary stop plate adjustably secured to said gauge strip, and a sliding stop plate, said sliding stop plate being fixed to said hitch bar and extending laterally under said side frame members, spring means operatively connected between the top of said lever and the forward end of said frame, said spring biasing said lever to maximum angled position.

2. A power actuated angle control device for disc harrow gangs comprising a hitch bar, a disc hitch frame including a pair of spaced apart side frame members telescopingly engaging said hitch bar, an actuating lever pivoted on said frame, said lever extending above and below said frame, an upper clevis plate secured on said hitch bar, said clevis plate extending laterally over said side frame members, a link extending between said clevis plate and a point adjacent the top of said lever, an anchor post mounted on said frame, a fluid actuated cylinder connected in operative relation between said post and said lever, an angle limiting means including a stationary stop plate adjustably secured to said frame, a sliding stop plate, said sliding stop plate being fixed to said hitch bar and extending laterally under said frame, spring means operatively connected between the top of said lever and the forward end of said frame, disc sections attached to said disc hitch, inner disc control rods connected between the inner ends of said disc sections and the lower end of said lever, and anchor links securing the outer ends of said disc sections to said sliding stop plate.

3. A power actuated angle control device for disc harrow gangs comprising a hitch bar, a disc hitch frame including a pair of spaced apart side frame members telescopingly engaging said hitch bar, an actuating lever pivoted on said side frame members, said lever extending above and below said frame, an upper clevis plate secured on said hitch bar, said clevis plate extending laterally over said side frame members, a link extending between said clevis plate and a point adjacent the top of said lever, an anchor post mounted on said slide members, a fluid actuated cylinder connected in operative relation between said post and said lever, an angle limiting means including a stationary stop plate adjustably secured under said frame, a sliding stop plate, said sliding stop plate being fixed to said hitch bar and extending laterally under said frame, spring means operatively connected between the top of said lever and the forward end of said frame, disc sections attached to said disc frame, inner disc control rods connected between the inner ends of said disc sections and the lower end of said lever, and outer control rods attached outwardly of said disc sections, said outer control rods extending between said disc sections and said sliding stop plate.

References Cited in the file of this patent

UNITED STATES PATENTS

| | | |
|---|---|---|
| 2,263,089 | Hornish | Nov. 18, 1941 |
| 2,338,698 | White I | Jan. 11, 1944 |
| 2,527,607 | White II | Oct. 31, 1950 |
| 2,579,086 | Oehler | Dec. 18, 1951 |
| 2,598,959 | Youngberg | June 3, 1952 |